Sept. 20, 1955 S. LEVIN 2,718,255
BELT SPLICING DEVICE
Filed June 29, 1953
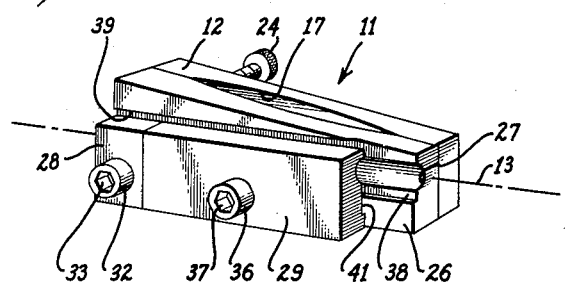
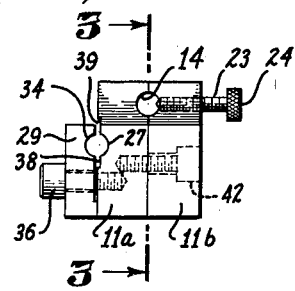
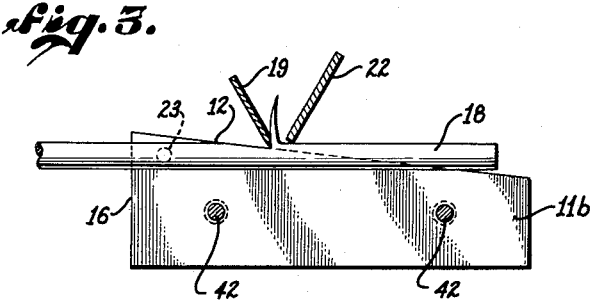
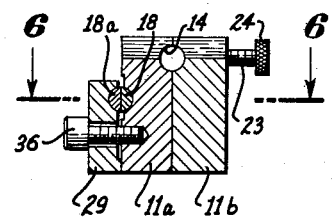
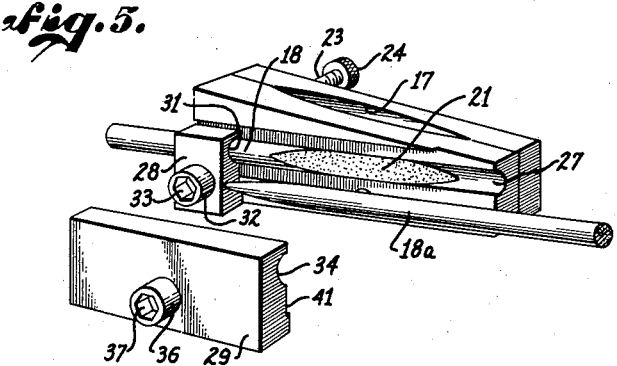
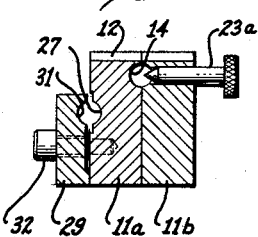
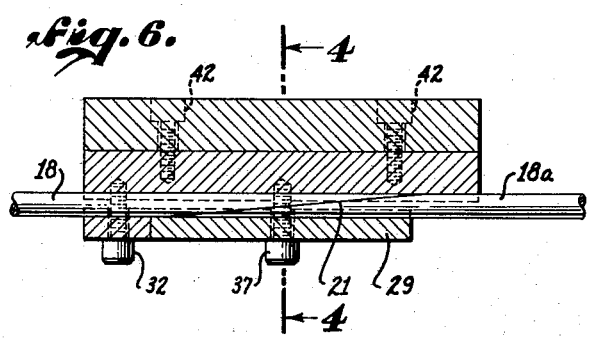
SAMUEL LEVIN,
*INVENTOR.*
HUEBNER, BEEHLER,
WORREL & HERZIG.
ATTORNEYS.
BY
*Warren T. Jessup*

2,718,255
BELT SPLICING DEVICE

Samuel Levin, Los Angeles, Calif., assignor to Louis Levin & Son, Inc., Los Angeles, Calif., a corporation of California Application June 29, 1953, Serial No. 364,656

7 Claims. (Cl. 154—42)

This invention relates to clamping devices, and more particularly to clamping devices for splicing leather belts.

In many types of machinery it is customary to employ endless belts, often made of leather, which extend around a drive pulley and around one or more driven pulleys. In some situations it is possible to mount the belt on the pulleys in endless form; but in other situations the construction of the machinery is such that it is necessary, or highly desirable, to apply the belt in open ended form by threading it through the appropriate places, and then splicing together the two ends of the belt to make it into the required endless belt.

It is an object of this invention to provide a simple, sturdy, compact and portable tool or device for assisting in splicing together the ends of a belt or belts.

It is another object of this invention to provide such a device as above which may be conveniently used for bevelling the ends of belts to prepare them for cementing and splicing by a lapped joint.

It is another object of this invention to provide a combination tool or device which may be used in bevelling the ends of a belt, and also to clamp together the lapped, cemented ends of a belt while the cement dries.

In accordance with these and other objects which will become apparent hereinafter, a preferred form of the present invention will now be described with reference to the accompanying drawings wherein:

Fig. 1 is a perspective view of the device;

Fig. 2 is an end view thereof;

Fig. 3 is an elevational section taken on line 3—3 of Fig. 2;

Fig. 4 is a cross section taken on line 4—4 of Fig. 6;

Fig. 5 is a perspective view showing certain parts of the device in unassembled position;

Fig. 6 is a longitudinal section taken on line 6—6 of Fig. 4; and

Fig. 7 is a cross section showing a modified form of the invention.

Referring to the drawing, the device is shown as comprised of an elongate orthogonal block 11, preferably made of metal such as steel. One of the elongate faces, in this case the top face 12, is at a slight angle of obliquity with respect to the axis 13 of the elongate block 11.

Extending longitudinally through the block 11 is a circular bore 14 which substantially parallels the axis 13. The bore 14 communicates at one end with one of the end faces 16 of the block 11, and at the other end with the oblique face 12. The communication of the bore 14 with the oblique face 12 forms an elongate elliptical intersection 17.

The bore 14 is adapted to receive one end of a circular cross section belt 18 of leather or equivalent material, passing through the bore 14 from the face 16 and projecting past the intersection 17 on the face 12, as shown in Fig. 3.

With the belt disposed in the block as above described, and as shown in Fig. 3, passage of a blade, such as a razor blade 19, down over the face 12 will cut off the end of the belt 18 on a bevel, the resulting cut being shown at 21 in Fig. 5. In the bevel cutting operation it is preferred to run a rectangular metal tab 22 along the top edge or surface of the belt 18 ahead of the blade 19, as shown in Fig. 3. Pressure of the tab 22 keeps the belt pressed down into the terminating portion of the bore 14, to insure a more uniform bevel 21, with resultant uniformity of lap for the joint. The use of the tab 22 also serves to protect the operator's fingers.

In order to hold the belt 18 firmly in the bore 14 during the cutting or bevelling operation, a clamping screw 23 having a knurled head 24 is provided, which is threaded into the block 11 transverse to the bore 14. The screw 23 communicates with the bore 14. After the belt 18 is passed into the bore 14, the screw 23 may be tightened up to clamp the belt 18 therein.

Alternatively, the screw 23 may be made in the form of a smooth pin having a slide fit in its bore, as shown in Fig. 7. Finger pressure on the pin, which is pointed, causes the point to embed itself into the belt 18 and hold the belt in position during the beveling operation. Following beveling, the pin is pulled out manually to release the belt.

In accordance with the present invention means are provided for clamping the lapped, cemented belt ends together during drying of the cement. To this end another one of the elongate faces the block 11, in this case the side face 26, is provided with a longitudinal groove 27 extending the length of the face 26. The groove 27 is complementary to the shape of the belt 18, in this case being substantially semicircular in cross-section.

Cooperating with the groove 27 are a pair of correspondingly grooved clamping plates 28 and 29, the former being a relatively short plate and the latter being a relatively long plate. The short plate 28 is disposed at one end of the block face 26, and has a groove 31, also of generally semicircular cross-section, which registers with and complements the groove 27 in the block face 26. A clamping screw 32 passes transversely through the short plate 28 and is threaded into the block 26. The screw 32 has a polygonal socket 33 to receive a suitable tightening wrench.

The short clamping plate 28 serves to hold in place one end of a belt 18, while the other end 18a of the belt also bevelled is cemented thereto at the bevel 21.

The long plate 29 is for the purpose of clamping the cemented joint during drying of the cement. The long plate 29 is aligned with the short plate 28, and has a groove 34 of generally semicircular cross-section which is aligned with the groove 31 in the short plate 28, and which registers with and complements the groove 27 in the block face 26. A clamping screw 36 passes transversely through the long plate 29 and is threaded into the block 11. The screw 36 is provided with a polygonal socket 37 to receive a tightening wrench. The plate 29 serves to clamp together the two bevelled ends 18 and 18a of the belt, so that they may be held immovable while the cement between the bevelled faces 21 dries.

A shallow longitudinal relief 38 is formed on the side face 26 symmetrically over and adjacent the groove 27. The upper edge 39 of the relief 38 is above the upper limit of the plates 28 and 29. The inner or engaging faces of the plates 28 and 29 are also relieved adjacent their respective grooves, as shown at 41, the relief 41 extending to the upper edge of the plates 28 and 29. The reliefs 38 and 41 permit of limited compression of the belt 18—18a, as the tightening or clamping screws 32 and 36 are screwed up, and enable the device to accommodate small variations in belt thickness.

While the block 11 has been inferentially described as being of solid one piece construction, it is preferred in practice to make it in two sections 11a and 11b, the dividing plane between the sections bisecting the bore 14. The two sections are permanently secured together by screws 42. By the use of this construction the bore 14 is more easily formed, by milling a half round slot in each of the sections 11a and 11b and then reaming out the bore 14 after the sections have been secured together by the screws 42.

Use of the device of the present invention is as follows: One end of a belt 18 is run into and through the bore 14 from the end 16 until it projects fully over the intersection 17. The clamping screw 23 is then tightened to clamp the belt 18 in the bore 14. A razor blade 19 is passed down across the face 12, as shown in Fig. 3, cutting the end of the belt 18 obliquely, on a bevel 21. In this operation the tab 22 is pressed on the belt ahead of the blade 19 to insure a uniform cut and to protect the fingers. The clamping screw 23 is loosened and the belt 18 is removed from the bore 14.

The belt 18 is then placed in the groove 27 formed in the side face 26, with the bevelled face 21 out, as shown in Fig. 5. The short plate 28 is clamped tightly against the belt 18 to hold it firmly to the block 11. Glue or other cementitious material is applied to the bevelled face 21 of the end of the belt 18, and if desired glue may also be applied to the corresponding or complementary bevelled face on the other end 18a of the belt. The two bevelled ends are then placed together to form a lapped joint, as shown in Fig. 6. The long plate 29 is placed over the lapped joint, and the screw 36 is tightened to apply the desired clamping pressure to the joint during the setting of the cement.

While the device as described has been designed particularly for a belt of circular cross-section, it will be readily understood that the invention may be constructed for belts of any cross-section, it being only necessary to make the bore 14 and grooves 27, 31 and 34 of appropriate complementary cross-section.

In some cases the clamping screw 23 need not be used, or may alternatively be omitted, relying instead on a close frictional fit between the belt 18 and the bore 14 to hold the belt in place during the cutting or beveling operation.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims.

What is claimed is:

1. Clamping device for splicing belts of generally circular cross-section comprising: an elongate metal block, one of the elongate faces being oblique to the block axis, said block having a circular bore therethrough paralleling said axis and communicating with said oblique face to form an elongate elliptical intersection therewith, said bore being adapted to receive a circular belt passing therethrough and projecting past said intersection, whereby passage of a blade over said face will cut the belt on a bevel, and a clamping screw threaded into said block and communicating with said bore to clamp the belt in said bore.

2. Clamping device for splicing belts comprising; an elongate metal block, one of the elongate faces being oblique to the block axis, said block having a bore therethrough paralleling said axis and communicating with said oblique face to form an elongate intersection therewith, said bore being adapted to receive a belt passing therethrough and projecting past said intersection, whereby passage of a blade over said face will cut the belt on a bevel, and a clamping screw threaded into said block and communicating with said bore to clamp the belt in said bore.

3. Clamping device for splicing belts comprising: an elongate metal block, one of the elongate faces being oblique to the block axis, said block having a bore therethrough paralleling said axis and communicating with said oblique face to form an elongate intersection therewith, said bore being adapted to receive a belt passing therethrough and projecting past said intersection, whereby passage of a blade over said face will cut the belt on a bevel.

4. Clamping device for splicing belts comprising: a block, one of the faces thereof being oblique to the block axis, said block having a bore therethrough paralleling said axis and communicating with said oblique face, said bore being adapted to receive a belt passing therethrough and projecting past said face, whereby passage of a blade over said face will cut the belt on a bevel.

5. Clamping device for splicing belts of generally circular cross-section comprising: an elongate metal block, one of the elongate faces of said block having a longitudinal groove therein of substantially semicircular cross-section, a short clamping plate disposed against said face adjacent one end of said face, said short plate having a groove of generally semicircular cross-section registering with said block groove, a clamping screw passing through said short plate and threaded into said block to clamp a belt in said groove between said block and short plate, a long clamping plate disposed against said face and aligned with said short plate, said long plate having a groove of generally semicircular cross-section registering with said block groove and aligned with said short plate groove, and a clamping screw passing through said long plate and threaded into said block to clamp together two cemented beveled faces formed on ends of a belt.

6. Clamping device for splicing belts of generally circular cross-section comprising: an elongate metal block, one of the elongate faces of said block having a longitudinal groove therein of substantially semicircular cross-section, a short clamping plate disposed against said face adjacent one end of said face, said short plate having a groove of generally semicircular cross-section registering with said block groove, a clamping screw passing through said short plate and threaded into said block to clamp a belt in said groove between said block and short plate, a long clamping plate disposed against said face and aligned with said short plate, said long plate having a groove of generally semicircular cross-section registering with said block groove and aligned with said short plate groove, and a clamping screw passing through said long plate and threaded into said block to clamp together two cemented beveled faces formed on ends of a belt, the adjacent faces on said block and said plates being formed with longitudinal reliefs adjacent said grooves which permit of limited compression of the belt as said clamping screws are tightened.

7. Clamping device for splicing leather belts of generally circular cross-section comprising an elongate metal block, one of the elongate faces being oblique to the block axis, said block having a circular bore therethrough paralleling said axis and communicating with said oblique face to form an elongate elliptical intersection therewith, said bore being adapted to receive a circular belt passing therethrough and projecting past said intersection, whereby passage of a blade over said face will cut the belt on a bevel, a clamping screw threaded into said block and communicating with said bore to clamp the belt in the bore, one of the other elongate faces of said block having a longitudinal groove therein of substantially semicircular cross-section, a short clamping plate disposed against said other face adjacent one end of said other face, said short plate having a groove of generally semicircular cross-section registering with said block groove, a clamping screw passing through said short plate and threaded into said block to clamp a belt in said groove between said block and short plate, a long clamping plate disposed against said other face and aligned with said short plate, said long plate having a groove of generally semicircular cross-section registering with said block groove and aligned with said short plate groove, and a clamping screw passing through said long plate and threaded into said block to clamp together two cemented beveled faces formed on ends of a belt.

References Cited in the file of this patent

UNITED STATES PATENTS 2,357,785   Warren _____ Sept. 5, 1944